United States Patent
Hollingshead et al.

(10) Patent No.: US 9,992,232 B2
(45) Date of Patent: Jun. 5, 2018

(54) POLICY BLOCK CREATION WITH CONTEXT-SENSITIVE POLICY LINE CLASSIFICATION

(71) Applicant: Cisco Technology, Inc., San Jose, CA (US)

(72) Inventors: Daniel Hollingshead, Somerville, MA (US); Sachin Vasant, Brookline, MA (US); Yedidya Dotan, Newton, MA (US); Umesh Kumar Miglani, North Chelmsford, MA (US); Denis Knjazihhin, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 15/131,604

(22) Filed: Apr. 18, 2016

(65) Prior Publication Data

US 2017/0208094 A1 Jul. 20, 2017

Related U.S. Application Data

(60) Provisional application No. 62/278,654, filed on Jan. 14, 2016.

(51) Int. Cl.
*H04L 29/06* (2006.01)
*H04L 12/24* (2006.01)

(52) U.S. Cl.
CPC .......... *H04L 63/20* (2013.01); *H04L 41/0893* (2013.01)

(58) Field of Classification Search
CPC ..................... H04L 63/20; H04L 41/0893
See application file for complete search history.

(56) References Cited

U.S. PATENT DOCUMENTS 5,764,911 A 6/1998 Tezuka et al.
5,968,176 A * 10/1999 Nessett ................... H04L 63/02
726/11

(Continued)

FOREIGN PATENT DOCUMENTS

JP 11-288382 10/1999
JP 2004-302751 10/2004
JP 2012-150733 8/2012

OTHER PUBLICATIONS

Anonymous: "Creating Firewall Rules (reference)", wiki.ipfire.org, Mar. 29, 2014, pp. 1-5, XP055258932, retrieved from the internet: https://web.archive.org/web/20140329122433/http://wiki.ipfire.org/en/configuration/firewall/rules/start [retrieved on Mar. 16, 2016].

(Continued)

*Primary Examiner* — Darren B Schwartz
(74) *Attorney, Agent, or Firm* — Edell, Shapiro & Finnan, LLC

(57) ABSTRACT

Presented herein are techniques for creating a policy block comprised of a group of lines of rules/statements across configuration files for network devices. An algorithm is provided that determines when multiple policies are to be merged together into one policy. In one embodiment, data is uploaded from a network that includes a plurality of network devices. The data represents policy rules configured on the plurality of network devices. The data representing the policy rules is compared for similarities in order to group together policy rules based on their similarities. Data is stored representing a plurality of clusters, each cluster representing a group of policy rules that have been grouped together. One or more configuration policies are generated to be applied across the plurality of network devices using the (Continued)

data representing each of the plurality of clusters, while maintaining context of policy rule processing.

20 Claims, 7 Drawing Sheets

(56) References Cited

U.S. PATENT DOCUMENTS

| | | | |
|---|---|---|---|
| 6,021,376 A | 2/2000 | Wilson | |
| 6,219,053 B1 | 4/2001 | Tachibana et al. | |
| 6,442,620 B1* | 8/2002 | Thatte | G06F 9/465 |
| | | | 719/316 |
| 6,738,908 B1 | 5/2004 | Bonn et al. | |
| 7,124,192 B2 | 10/2006 | High, Jr. et al. | |
| 7,231,661 B1 | 6/2007 | Villavicencio et al. | |
| 7,263,719 B2 | 8/2007 | Jemes et al. | |
| 7,444,395 B2 | 10/2008 | Sanghvi et al. | |
| 7,484,237 B2 | 1/2009 | Joly et al. | |
| 7,516,475 B1 | 4/2009 | Chen et al. | |
| 7,653,930 B2 | 1/2010 | Griffin et al. | |
| 7,774,830 B2 | 8/2010 | Dillaway et al. | |
| 8,140,664 B2 | 3/2012 | Huang et al. | |
| 8,234,387 B2 | 7/2012 | Bradley et al. | |
| 8,424,053 B2 | 4/2013 | Gottimukkala et al. | |
| 8,429,255 B1 | 4/2013 | Khan et al. | |
| 8,452,876 B1 | 5/2013 | Williams et al. | |
| 8,490,163 B1 | 7/2013 | Harsell et al. | |
| 8,719,919 B2 | 5/2014 | Rice et al. | |
| 8,793,763 B2 | 7/2014 | Williams et al. | |
| 9,325,733 B1* | 4/2016 | Kolman | H04L 63/1416 |
| 9,401,933 B1* | 7/2016 | Dotan | H04L 63/20 |
| 9,769,210 B2* | 9/2017 | Dotan | H04L 63/20 |
| 2001/0032248 A1 | 10/2001 | Krafchin | |
| 2002/0112043 A1 | 8/2002 | Kagami et al. | |
| 2002/0169957 A1 | 11/2002 | Hale et al. | |
| 2003/0021283 A1* | 1/2003 | See | H04L 41/0213 |
| | | | 370/401 |
| 2003/0226038 A1 | 12/2003 | Raanan et al. | |
| 2004/0025016 A1 | 2/2004 | Focke et al. | |
| 2004/0103211 A1* | 5/2004 | Jackson | H04L 41/0893 |
| | | | 709/244 |
| 2004/0193827 A1 | 9/2004 | Mogi et al. | |
| 2004/0225877 A1* | 11/2004 | Huang | G06F 21/552 |
| | | | 713/100 |
| 2006/0129933 A1 | 6/2006 | Land et al. | |
| 2006/0161879 A1 | 7/2006 | Lubrecht et al. | |
| 2007/0220588 A1* | 9/2007 | Panda | G06Q 20/102 |
| | | | 726/1 |
| 2008/0034401 A1 | 2/2008 | Wang | |
| 2008/0126963 A1 | 5/2008 | Kim et al. | |
| 2008/0183603 A1 | 7/2008 | Kothari et al. | |
| 2008/0201760 A1* | 8/2008 | Centonze | G06F 21/604 |
| | | | 726/1 |
| 2008/0209505 A1 | 8/2008 | Ghai et al. | |
| 2008/0216148 A1 | 9/2008 | Bienek et al. | |
| 2008/0259919 A1* | 10/2008 | Monga | H04L 43/12 |
| | | | 370/389 |
| 2008/0307489 A1* | 12/2008 | Hubbard | H04L 51/12 |
| | | | 726/1 |
| 2008/0320549 A1* | 12/2008 | Bertino | G06F 21/604 |
| | | | 726/1 |
| 2009/0158385 A1 | 6/2009 | Kim et al. | |
| 2010/0043053 A1* | 2/2010 | Wei | H04L 47/10 |
| | | | 726/1 |
| 2010/0082513 A1 | 4/2010 | Liu | |
| 2010/0122208 A1 | 5/2010 | Herr et al. | |
| 2011/0191460 A1* | 8/2011 | Sailhan | H04L 41/0893 |
| | | | 709/224 |
| 2012/0046989 A1* | 2/2012 | Baikalov | G06Q 10/0635 |
| | | | 705/7.28 |
| 2012/0047575 A1* | 2/2012 | Baikalov | G06F 21/577 |
| | | | 726/21 |
| 2013/0246334 A1 | 9/2013 | Ahuja et al. | |
| 2014/0029039 A1 | 1/2014 | Deter et al. | |
| 2014/0075494 A1* | 3/2014 | Fadida | G06F 9/45558 |
| | | | 726/1 |
| 2014/0109190 A1 | 4/2014 | Cam-Winget et al. | |
| 2014/0165128 A1 | 6/2014 | Auvenshine et al. | |
| 2015/0074750 A1 | 3/2015 | Pearcy et al. | |
| 2016/0026620 A1* | 1/2016 | Gidney | G06F 17/2785 |
| | | | 705/311 |
| 2016/0094561 A1* | 3/2016 | Jagtap | H04L 63/102 |
| | | | 726/28 |
| 2016/0212167 A1* | 7/2016 | Dotan | H04L 63/20 |
| 2016/0212168 A1* | 7/2016 | Dotan | H04L 63/20 |
| 2016/0212169 A1* | 7/2016 | Knjazihhin | H04L 63/20 |
| 2016/0212170 A1* | 7/2016 | Martherus | H04L 63/20 |
| 2016/0301717 A1* | 10/2016 | Dotan | H04L 63/20 |
| 2016/0344738 A1* | 11/2016 | Dotan | H04L 63/101 |
| 2016/0344773 A1* | 11/2016 | Knjazihhin | H04L 63/20 |
| 2017/0032322 A1* | 2/2017 | Grover | G06Q 10/1053 |
| 2017/0054757 A1* | 2/2017 | Siswick | G06F 3/04817 |
| 2017/0142158 A1* | 5/2017 | Laoutaris | H04L 63/20 |

OTHER PUBLICATIONS

Michael Teger, "Developer's Guide for Oracle Entitlements Server", Oracle® Fusion Middleware, 11g Release 1 (11.1.2), E27154-01, Jul. 2012, 132 Pages.

Matt Swain, "Chemical similarity search in MongoDB", http://blog.matt-swain.com/post/87093745652/chemical-similarity-search . . . , Jun. 3, 2014, 16 pages.

\* cited by examiner

POLICY BLOCK CREATION WITH CONTEXT-SENSITIVE POLICY LINE CLASSIFICATION

PRIORITY CLAIM

This application claims priority to U.S. Provisional Application No. 62/278,654, filed Jan. 14, 2016, the entirety of which is incorporated herein by reference.

TECHNICAL FIELD

The present disclosure relates to managing network security and similar devices.

BACKGROUND

Evaluating lines of network policies across different network devices is complicated, particularly when trying to assign access rules to policy classifications. For example, a firewall determines whether to permit or deny traffic based upon the list of rules contained within its configuration file. An individual rule specifies the type of traffic that the firewall permits or denies, based on attributes such as protocol, source network, source port, destination port, destination network, interface used, etc. A user would like to work with sets of these rules that have been combined into logical units referred to herein as "policies".

DESCRIPTION OF EXAMPLE EMBODIMENTS

Overview

Presented herein are techniques for creating a policy block comprised of a group of lines of rules/statements across configuration files for network devices. An algorithm is provided that determines when multiple policies are to be merged together into one policy. This is particularly useful when deploying one or more configuration policies on the plurality of network devices. In one embodiment, data is uploaded from a network that includes a plurality of network devices. The data represents policy rules configured on the plurality of network devices. The data representing the policy rules is compared for similarities in order to group together policy rules based on their similarities. Data is stored representing a plurality of clusters, each cluster representing a group of policy rules that have been grouped together. One or more configuration policies are generated to be applied across the plurality of network devices using the data representing each of the plurality of clusters, while maintaining context of policy rule processing.

DETAILED DESCRIPTION

Figure 1:
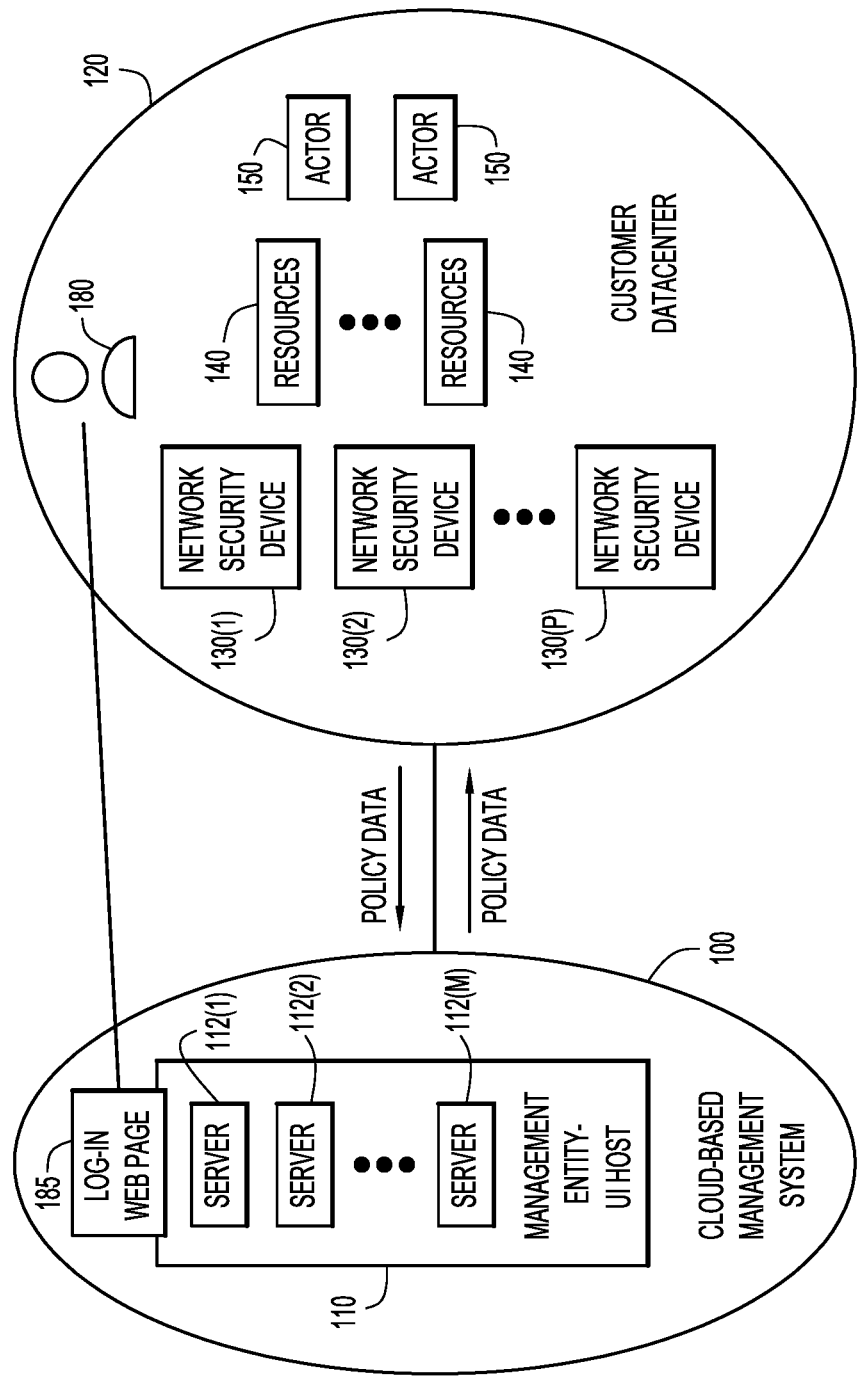
FIG. 1 illustrates a cloud-based management system for management of network security devices and in which system the policy block creation techniques presented herein may be used, according to example an embodiment.

With reference to FIG. 1, there is shown a cloud-based management system 100 for managing policy configurations of network security devices, according to an embodiment. Cloud-based management system 100 communicates with network security devices of a customer datacenter or network 120. FIG. 1 shows the details of one customer datacenter, but it should be understood that the cloud-based management system 100 may connect and communicate with multiple customer datacenters.

The cloud-based management system 100 includes a management entity 110 including one or more computer servers 112(1)-112(M) that execute software to perform the operations described herein. An example of a hardware configuration for management entity 110 is described in more detail below in connection with FIG. 4.

Customer datacenter/network 120 includes a plurality of network security devices or products (also referred to as network security appliances) 130(1)-130(P). Within a customer datacenter there are one or more resources 140 and one or more actors 150. The resources 140 may include servers, databases, and the actors 150 are users or processes using a computing device (personal computer, SmartPhone, etc.) that may seek access to one or more of the resources 140. The resources and actors may also reside outside the customer datacenter itself, e.g., in the Internet. The network security devices 130(1)-130(P) control access of the actors 150 to the resources 140 according to network security policies, e.g., sets of one or more network security rules configured on the respective network security devices.

As described herein, data is sent to the network 1200 to deploy one or more configuration policies on the plurality of network security devices 130(1)-130(P).

An administrator 180 may log onto a log-in web page 185 served by one the servers 112(1)-112(M) in order to enter commands to deploy policy configurations on the network security devices 130(1)-130(P).

As an example, given a set of firewall configuration files for a given user, it would be beneficial to automatically group the (possibly) thousands of individual rules into a manageable number of policies, where each policy has an internal cohesion. As used herein a "block" or "policy block" is a group of lines of rules/statements across configuration files for one or more network devices. The goal of the techniques presented herein is to group lines into a policy block, and in particular to determine when to take multiple policies and merge them together into one policy, and in so doing, divine the intent of the policy writer. A group of access rules are used to perform a network security task or function.

Different configurations for network devices have different sequences of rules. An automated process is presented herein that aligns these different sequences of rules to group them.

Figure 2A:
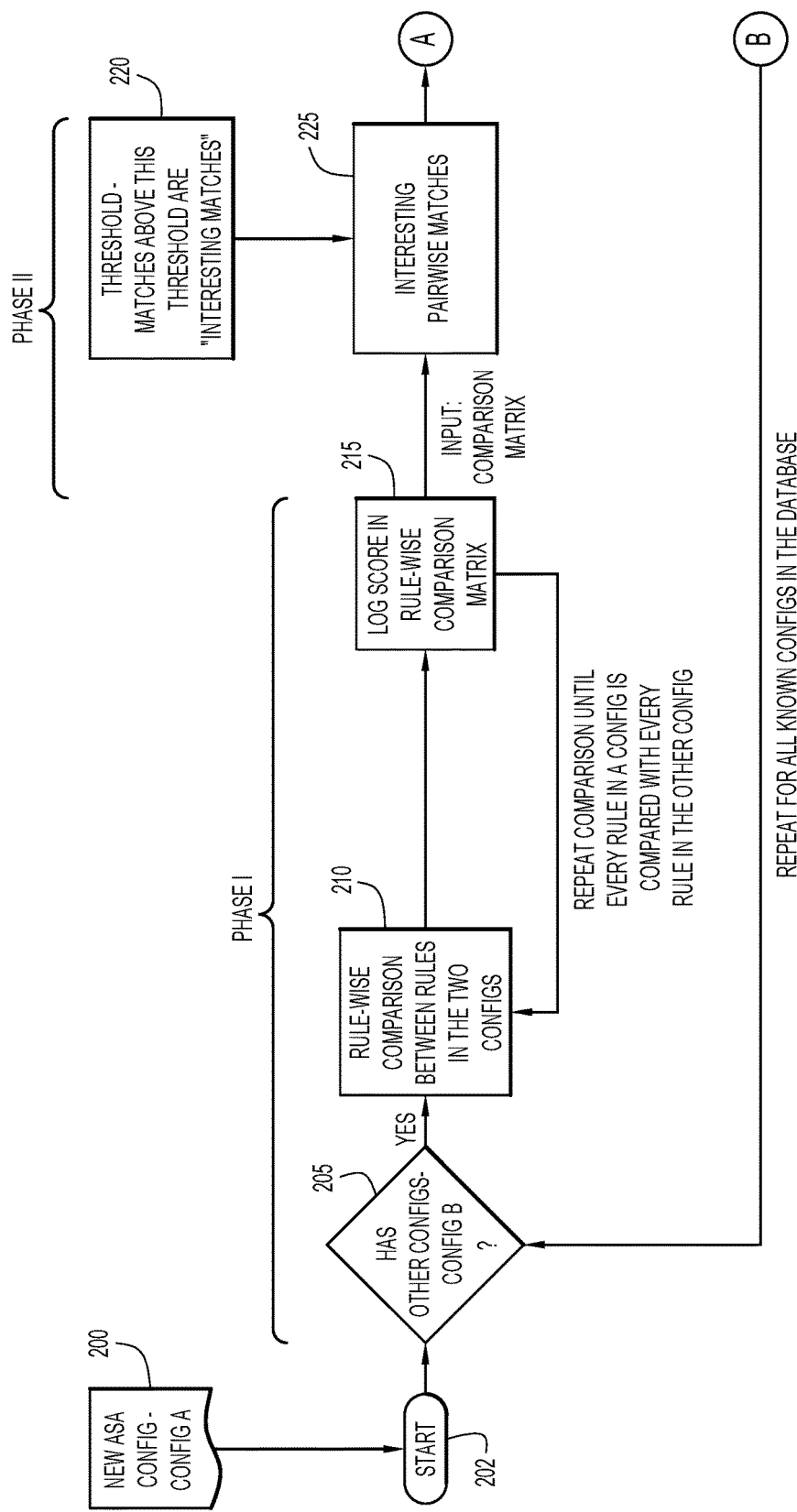
FIGS. 2A-2C depict a flow chart for a process to generate policy blocks, according to one example embodiment.
Figure 2B:
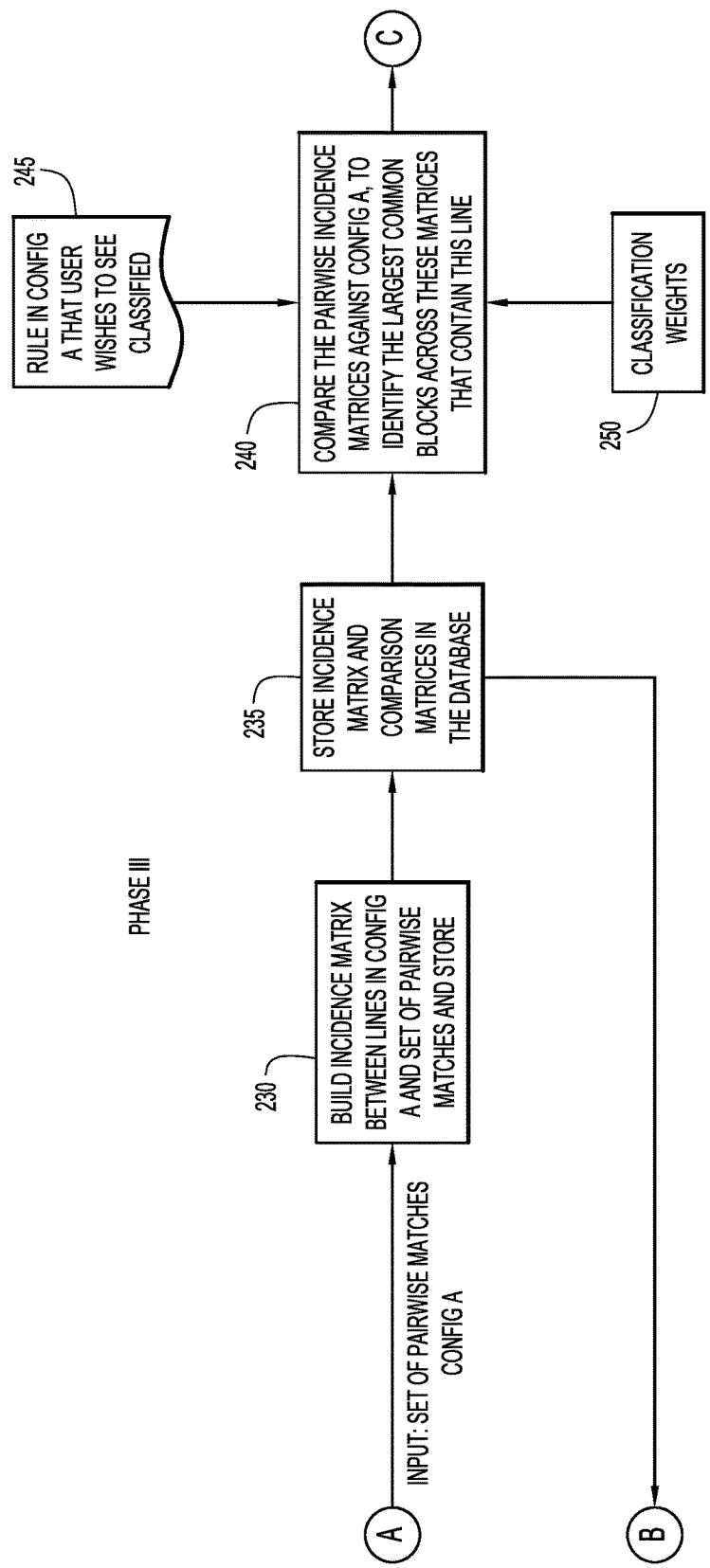
Figure 2C:
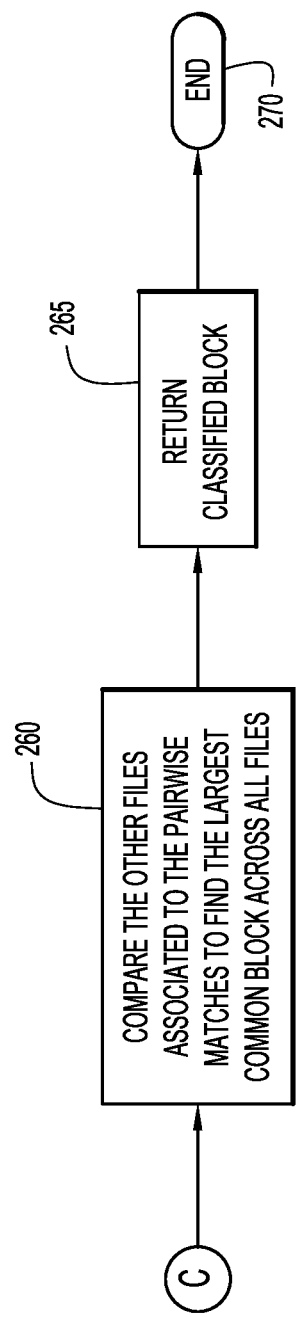

Reference is now made to FIGS. 2A-2C for a description of a process according to one embodiment. The algorithm is broken down into three phases denoted Phase I, Phase II and Phase III. Each phase may be stateless. Phase III can happen only after Phase II, which can happen only after Phase I. However, a given configuration (e.g., Config A) can be in Phase II, another configuration (e.g., Config B) can be in Phase I and still another configuration can be in Phase III. For each configuration, each phase is a parallelizable algorithm.

Phase I

Every pair of rules across configuration files is assigned a value that represents how close the two rules are, referred to as its "similarity score". Specifically, the process starts when a new configuration file is received. FIG. 2A shows that at 200, a configuration file (denoted Config A), is received for a security appliance, and the process begins at 202. The security appliance may provide firewall functionality, as an example.

A configuration for a security appliance may take the form of:

access-list MAIL extended permit tcp host 10.1.1.38 host 10.1.1.7 eq smtp
access-list MAIL extended permit tcp host 10.1.1.31 eq smtp host 10.1.1.7 eq smtp
access-list MAIL extended permit tcp host 10.1.1.32 eq smtp host 10.1.1.7 eq smtp
access-list MAIL extended permit tcp host 10.1.1.33 eq smtp host 10.1.1.7 eq smtp
access-list MAIL extended permit tcp host 10.1.1.34 eq smtp host 10.1.1.7 eq smtp
access-list MAIL extended permit tcp host 10.1.1.35 eq smtp host 10.1.1.7 eq smtp
access-list MAIL extended permit tcp host 10.1.1.36 eq smtp host 10.1.1.7 eq smtp
access-list MAIL extended permit tcp host 10.1.1.37 eq smtp host 10.1.1.7 eq smtp Phase I consists of operations 205, 210 and 215. At 205, a determination is made as to whether there are other configuration files (e.g., Config B) in the database for a security appliance. If so, then at 210, a rule-wise comparison is made between rules in the two configuration files (e.g., Config A and Config B). At 215, a score from the rule-wise comparison is logged in a rule-wise comparison matrix. Operations 210 and 215 are repeated until every rule in a configuration file is compared with every rule in the other configuration file. The output of operation 215 is a comparison matrix, and it is supplied as input to Phase II. A comparison matrix contains similarity scores between configurations.

Phase II

In Phase II, given the comparisons from the Phase I, using every pair of configuration files, "sub-classifications" (also referred to herein as "sub-classes") are built. For a given pair of configuration files (A,B), a sub-classification contains a set of lines from file A and a set of lines from file B whose match scores are above a variable threshold. The threshold is configured at 220 and matches that are above the threshold are flagged as "interesting" in operation 225.

At operation 225, this alignment of comparison scores can be performed by any modular array alignment algorithm. An alignment algorithm partially matches two arrays so as to maximize the scores of aligned values while minimizing how much the arrays need to be disturbed from their starting formation to form the alignment. Many examples of such algorithms come from the computational biology space, where there are many known algorithms for solving the problem of local DNA sequence alignment (Smith-Waterman, for example). The Smith-Waterman algorithm performs local sequence alignment for determining similar regions between two strings or nucleotide or protein sequences. The Smith-Waterman algorithm compares segments of all possible lengths and optimizes a similarity measure. Traditional alignment problems treat the matches as binary (complete match or mismatch), whereas in this case most scores will be fuzzy (i.e. scores between 0 and 1), requiring slight modifications.

Phase III

Given the sub-classifications from the Phase II, they are merged into full classifications across all of the configuration files, which will eventually become the basis of a user's policy. Reference is now made to FIG. 2B.

At 230, the set of pairwise matches from operation 225 of Phase II (FIG. 2A) are used as input to build an incidence matrix between lines in a given configuration file (e.g., Config A) and a set of pairwise matches, and the results are stored. The incidence matrix is a matrix of binary values, e.g., each cell (i,C) of the matrix indicating if a line i in the configuration file is in the sub-class C (with value 1) or not (with value 0). At 235, the incidence matrix and comparison matrices are stored. At 240, the pairwise incidence matrices are compared against a given configuration file (e.g., Config A) to identify the largest common blocks across these matrices that contain a given policy rule line/statement, which is received as input at 245. Classification weights, shown at 250, may be used in the comparison operation 240.

As shown in FIG. 2C, the output of operation 240 is used in operation 260. At 260, a comparison is made with other configuration files associated to the pairwise matches to find the largest common block across all configuration files. At 265, a classified block is returned, and the process ends at 270.

More concretely, assume a user has selected a line a for which they wish to see suggested classifications. Taking the configuration file A containing line a, an incidence matrix is constructed between lines in configuration file A and the sub-classifications from Phase 2 which refer to configuration file A, where a cell (x,C) will have a value of 1 if and only if line x was contained within sub-classification C, else 0.

Starting from line a, a block of lines is built out surrounding that line which contains the greatest percentage score in the incidence matrix. A set of lines will have a higher score if those lines share the same sub-classifications (incidences). Given that block, sub-classes which use that block may be merged to arrive at a final suggested classification.

Each incidence matrix compares lines in a single configuration file against sub-classifications (output from Phase II) of that configuration file. For example, configuration file A will result in an incidence matrix of the lines of configuration file A against sub-classes drawn from the results of Phase II on the pairs (A,B), (A,C), etc., for all other configuration files. A cell $(x, c_{AB})$ in the matrix will have a value of 1 if and only if line x (from configuration file A) was contained within subclass $c_{AB}$ (generated between configure files A and B) else 0. By these operations, the lines of configuration file A can find the optimal sub-classes to merge to find their ideal classification across the set of configuration files.

This operation may be performed multiple times with different weights to arrive at different suggestions for the user. For a global classification of all lines across all configuration files, the above algorithm is run for each line and the highest scoring results are chosen.

Consider two rules r and r'. Consider configuration files that have rules as: [ . . . r,r' . . . ], [ . . . r,r'',r'], [ . . . r', r . . . ].

The rules r,r' should form a policy block. However, in the case [ . . . r,r' . . . ], [ . . . r . . . r'] or the case [ . . . r, r' . . . ], [ . . . r . . . ], [ . . . r' . . . ] the rules r,r' should not be a block.

Example 1

Allow SMTP traffic to Object Group Exchange servers
Allow POP3 traffic to Object Group Exchange servers
Allow HTTPS traffic to Object Group exchange Servers
These lines should probably be grouped.

Example 2

Block all ICMP traffic
Allow port 15672 to server 10.0.0.1
Allow port 3712 to server 192.168.1.13
These lines should probably not be grouped.

The foregoing present mechanisms by which many configuration files can be correlated and simplified into a set of policy classes. A single rule with exact text matching is easy to find in configuration files. The methods presented herein allow for the ability to create a block of rules, with some variations within the configuration file and across configuration files and yet be able to extract a block of rules common to such group of configuration files, where number of files, variations within and between files are parameters. This helps in creating a more uniform policy. In other words, as a result of the blocks of rules that are created, it is possible to generate one or more configuration policies to be applied across a plurality of network devices.

As explained above, the methods presented herein involve pairwise comparisons, though Phase III achieves a larger convergence where there are "merges" based on the previous phases. The "pairs" being compared in Phase 1 and Phase II are different. In Phase I, single-line rules from configurations are compared for similarity.

In Phase II, two configuration files are compared to find what are called sub-classifications, which are blocks of rules common between the two files. For example, the lines a, b, and c may be found close to each other in configuration A. The sub-classification algorithm may then detect that similar (according to Phase I) lines a', b', and c' are found in configuration B. A sub-classification may be formed between A and B for this pair ({a,b,c},{a',b',c'}).

Phase III does not involve pairwise comparisons. Phase III takes these sub-classifications and a target rule, and creates a classification, i.e., a block of common rules across all files (F1, F2, . . . Fn) that contains this target rule.

To clarify, the method is independent of the specific scoring mechanisms. In Phase 1, the algorithm generates a scoring matrix comparing individual rules using the scoring mechanism linked above (or any other scoring mechanism).

Figure 3:
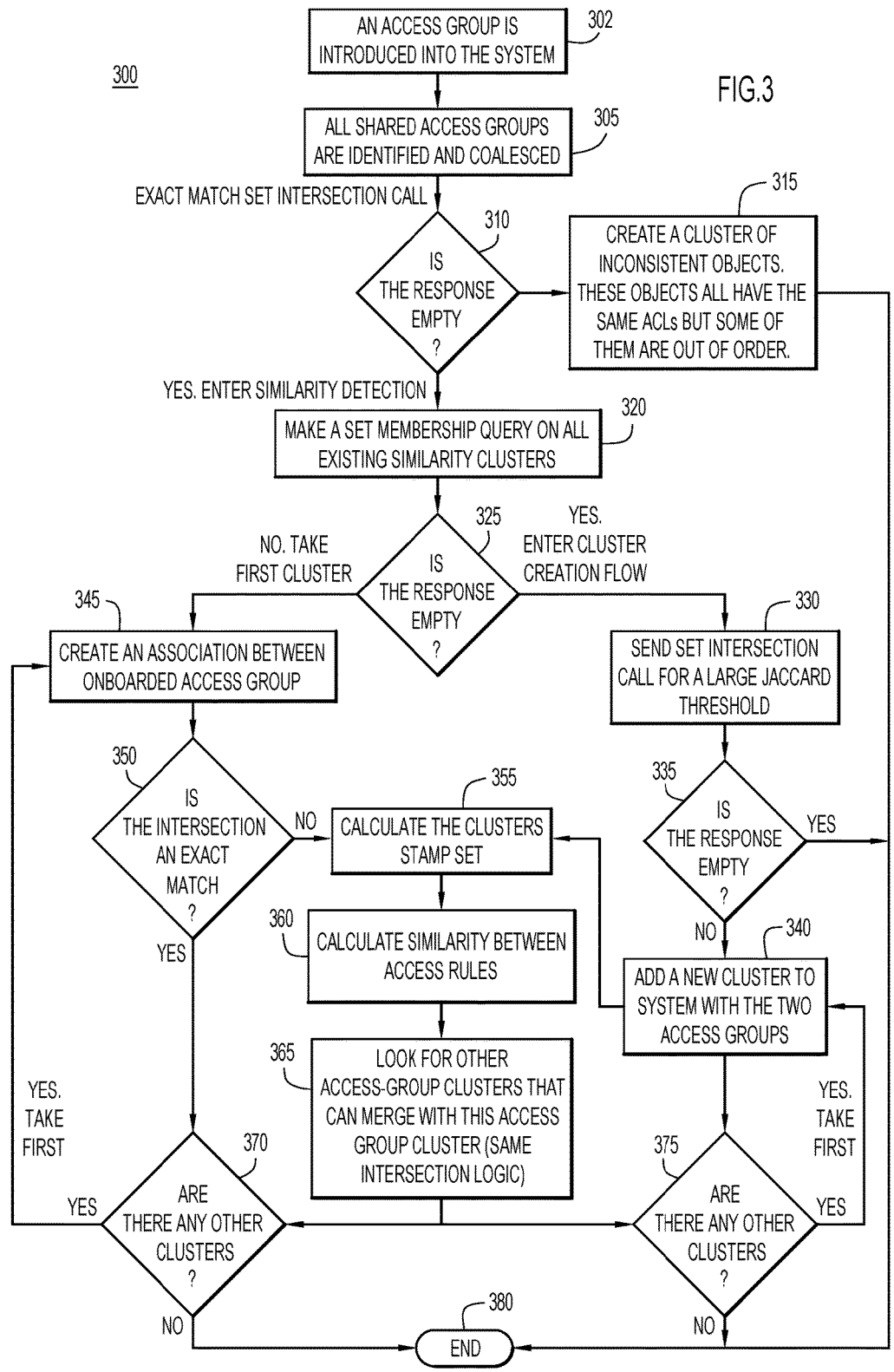
FIG. 3 is a flow chart for classifying policy rule statements, according to another example embodiment.

Reference is now made to FIG. 3 for description of another embodiment. The process depicted in FIG. 3 involves another way of determining how to group/cluster policy rule statements for network devices. This method is based on Jaccard's coefficient, which is a common measure of document similarity. Jaccard's coefficient of two sets of elements A and B is simply |A ∩ B|/|A ∪ B|, i.e., the ratio of the intersection of the two sets to their union. So two sets with Jaccards coefficient of 1 are identical and with 0 are disjoint. For example, two sets with a Jaccard's coefficient of 0.7 could be considered to be similar.

A goal of policy block creation is to classify a "chunk" of access rules and try to identify a similar policy block. It is desirable to unify access groups and create a single point of management. Hoping to find exact matches across network device configuration files will prove futile, because at some point some network administrator may have changed some policy somewhere. Also, different local area networks in a organization's network may have differing configurations. A generalized mechanism is useful to identify similar access-groups, and allow for parameterization and access group management. Access groups are a logical collection of access lists, e.g., access control lists (ACLs). Access groups determine the entire access policy for a particular network component, such as allow Network Time Protocol (NTP) in, but do not allow Simple Mail Transfer Protocol (SMTP) access, etc.

The process 300 shown in FIG. 3 can achieve improvement in several aspects.

Classification speed and optimization. If speed cannot be achieved, it seeks to delay classification until a user explicitly decides to classify a policy block.

Classification sensitivity. The algorithm should not be sensitive to the order of input among classes.

Use classification as a means to promote parameterization.

Potentially allow classifying different files simultaneously.

Delegate as much logic as possible to a database.

The process 300 of FIG. 3 uses clustering and hierarchical clustering techniques to determine similarity between access rules, and in particular to greatly expedite the matching determination between access rules. The process 300 represents the similarity between access rules as a model object. This model object is called a cluster. The process 300 allows for querying for a particular access rule for membership within a particular cluster, and creating a new cluster, when necessary.

For the sake of efficiency, the following assumptions are made in connection with the process 300. A new access group (collection of policy rule statements or access rules) is either (a) allowed to join one/many clusters, or (2) creates a new cluster. Whenever a cluster is created, there are exactly two members in the cluster. Access groups with a very high incidence of similarity are combined together.

A stamp is generated for each natural grouping in a network device, e.g., a firewall. The process 300 involves attempting to create clusters that are similar to each other. This reduces the problem space significantly. Then once these clusters are created, similarities comparisons are run within those as new candidate rules are analyzed to determine whether to join new rules to a cluster.

The process 300 beings at 302 when an access group is introduced into the system. At 305, all shared access groups are identified and coalesced and a call is made to determine if there are any exact match intersection sets. That is, a comparison is made between the new access groups and all existing access groups to determine is there is an exact match. At 310, it is determined whether the response/output of the comparison is empty. If the response is not empty, then at 315, a cluster of inconsistent objects is created, which all have the same ACLs but some of them may be out of order. On the other hand, if it is determined at 310 that the response is empty, then a similarity detection is initiated at 320. Specifically, at 320, a set membership query is created that is run against all existing similarity clusters. This is the same Jaccard coefficient call, but this time on a cluster rather than other access groups. This generates a query to determine whether the access group is a member of an existing cluster. At 325, it is determined whether the response/output of operation 320 is empty. If the response is empty, then a flow is entered to create a cluster. Specifically, at 330, a set intersection call is made with a relatively large Jaccard threshold. This is a query that calculates the Jaccard coefficient with another access group. It filters access groups by their Jaccard coefficient. So if the coefficient is 'high' (above the threshold referred to herein) it is determined that this is a 'similar' access group and therefore a cluster is created with it. At 335, it is determined whether the response of operation 330 is empty. At 340, if the response is not empty, then a new cluster is added to the system with the two access groups that were undergoing comparison.

If at operation 325, it is determined that the response is not empty, then at 345, using the first cluster, an association is created between the on-boarded access group. After learning from operation 320 that an access group can belong to a cluster, operation 325 simply adds this access group to the cluster. An access group is included in a cluster by creating an "association." Data model associations are a way of creating relations in non-relational databases.

At 350, it is determined whether the intersection (determined at 320) is an exact match. If it is not an exact match, then at 355, the cluster's stamp set is calculated. In operation 320, where it is queried whether an access group can belong to a cluster, the cluster needs a set of stamps (just like the one that the access group has). The stamp set of a cluster is the intersection of the set of stamps of all access groups in the cluster. Moreover, operation 355 is performed also after operation 340.

Next, two asynchronous operations are performed at 360 and 365. At 360, a similarity between access rules is computed, such as by the process depicted in FIGS. 2A-2C, described above. At 365, a search is made for other access group clusters than can be merged with this access group cluster.

At 370 and 375, it is determined whether there are other access group clusters. At 370, if there are other access group clusters, then the flow returns to operation 345 and at 375, if there are other access group clusters, the flow returns to operation 340. In other words, both of operations 335 and 345 are repeated if there are other access group clusters that can be merged with the current access group cluster. If there are no more access group clusters, then the process ends at 380.

Furthermore, as is apparent from FIG. 3, the process ends at 380 after operation 315, and also if the response is empty in operation 335.

Access Group Data Model

Below an example of an access group data model is provided. The active rules in an access group are: RuleAction, protocol, sourceAddress, sourcePort, destinationAddress, destinationPort. A set intersection is performed on access rule stamps (denoted "accessRuleStamps"). The stamp could be as simple as a hash computation on an access rule or some small numeric representation of some access rule. In the example data model below, two access rules are shown, each having RuleAction, Protocol, sourceAddress, sourcePort, destinationAddress, destinationPort. For example, the stamp for the first access rule is denoted "12345" and the stamp for the second access rule is denoted "45678".

The stamp can be abstract. It does not have to be tied to an access rule. It could be based on the number of external IP addresses, for example.

The "numAccessRules" quantity indicates the number of access rules in a set or group and should be equal to the number of access rule stamps for the set. In the example below, "numAccessRules" is equal to 2 because there are two access rules in the set or group. The quantity numAccessRules is useful when deciding whether to compare two sets of access rules because if the quantity numAccessRules greatly differs between two given sets, it is not worthwhile to compare them because it is unlikely if not impossible to result in a similarity greater than a reasonable threshold, such as 0.7.

Access Group Data Model Example

```
{
    "uid": "5da07854-38d2-4bb7-a4eb-7a6a78336b56",
    "name": "outside-acl-in",
    "namespace": "asa",
    "type": "accessgroups",
    "direction": "in",
    "numAccessRules" : 2,
    "accessRuleStamps": [
        12345,
        45678
    ]
    "accessRules": [
        {
            "ruleAction": {
                "name": "permit",
                "contentUid": null
            },
            "protocol": {
                "name": "tcp",
                "contentUid": null
            },
            "sourceAddress": {
                "name": "MA-DATA-CENTER",
                "contentUid":
                "2dba4c54-1bd1-45ca-a1c6-49d8b6a644bd"
            },
            "sourcePort": null,
            "destinationAddress": {
                "name": "any",
                "contentUid": null
            },
            "destinationPort": {
                "name": "eq 8600",
                "contentUid": null
            }
        },
        {
            "ruleAction": {
                "name": "permit",
                "contentUid": null
            },
            "protocol": {
                "name": "udp",
                "contentUid": null
            },
            "sourceAddress": {
                "name": "MA-DATA-CENTER",
                "contentUid":
                "12345c54-1bd1-45ca-a1c6-49d8b6a644bd"
            },
            "sourcePort": null,
            "destinationAddress": {
                "name": "any",
                "contentUid": null
            },
            "destinationPort": {
                "name": "eq 8600",
                "contentUid": null
            }
        }
    ],
    "shared": false,
    "sharedDetectorDigest":
    "UG+bG0gQKxNyfR603/PwM/6PvylT+BCH5RJ41nG1xiQ=",
```

Below is an example of a cluster data model. The cluster is a representation of all of its members—that is, all of the rules that have been grouped together due to similarities. The name given to this example cluster data model is "outside-ad-in". Noteworthy is that the example cluster data model below includes quantities "maxNumAccessRules" and "minNumAccessRules" parameters. maxNumAccessRules represents the maximum number of access rules a member of this cluster has, and minNumAccessRules is the minimum number of access rules the child has. Also, accessRuleStamp is the intersection of the access rules stamps in the cluster.

To avoid having the access rule stamp diminish rapidly for a cluster, a higher Jaccard threshold may be set for the cluster membership phase. Also, to encourage creation of a cluster block initially, the Jaccard threshold for the access-group query can be lower (e.g., 0.6).

Cluster Data Model Example

```
{
    "uid": "5da07854-38d2-4bb7-a4eb-7a6a78336b56",
    "name": "outside-acl-in",
    "namespace": "asa",
    "type": "policycluster",
    "direction": "in",
    "maxNumAccessRules" : 1,
    "minNumAccessRules": 3,
    "accessRuleStamps": [
        12345,
        45678
    ]
    "clusterType" : "SIMILAR"
}
```

Figure 4:
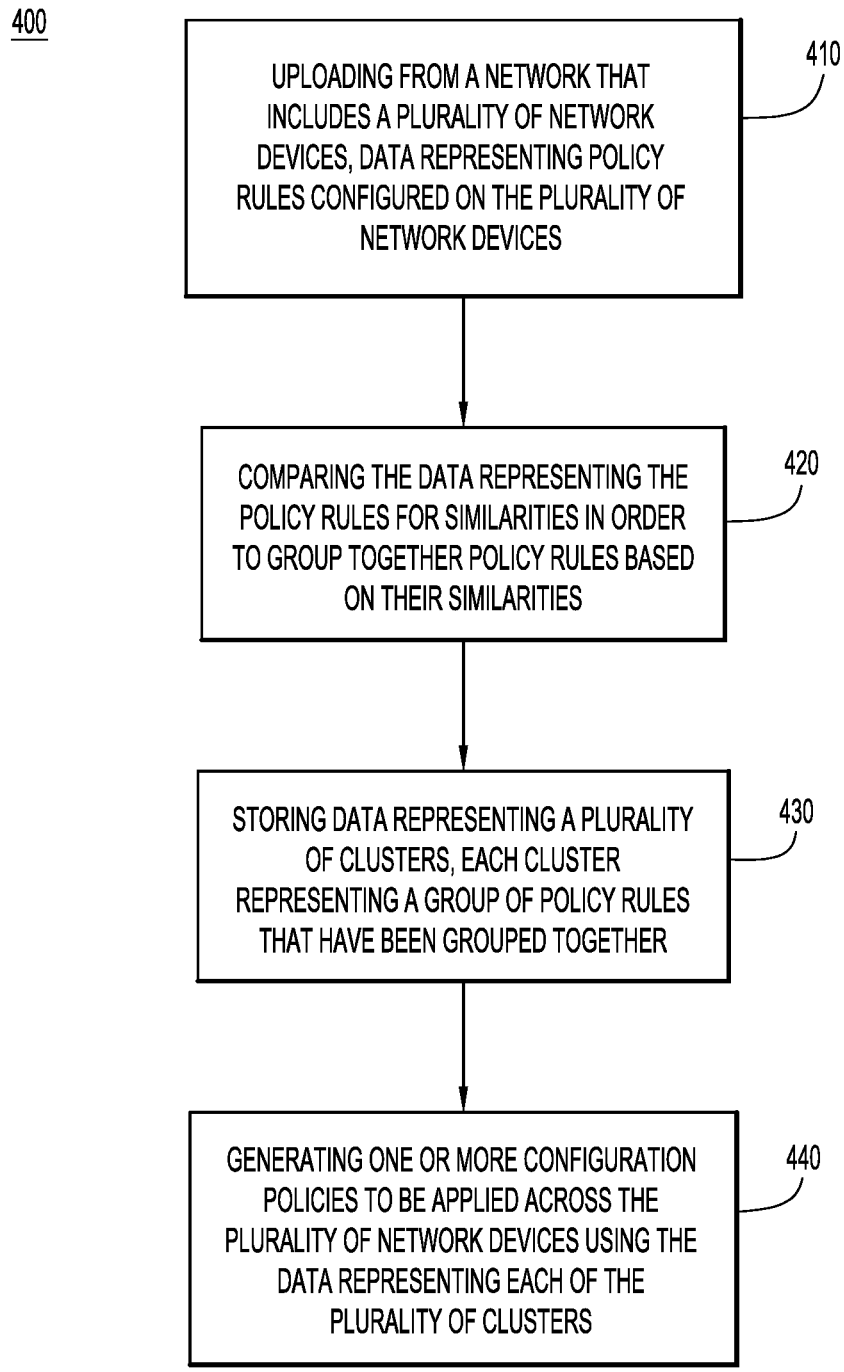
FIG. 4 is a generalized flow chart for a process for grouping policy rule statements according to an example embodiment.

FIG. 4 illustrates a high-level flow chart of a process 400 that generalizes the concepts described above in connection with FIGS. 1-3. Reference is also made to FIG. 1 for purposes of this description. At 410, data is uploaded from a network that includes a plurality of network devices, the data representing policy rules configured on the plurality of network devices. At 420, the data representing the policy rules is compared for similarities in order to group together policy rules based on their similarities. At 430, data is stored that represents a plurality of clusters, each cluster representing a group of policy rules that have been grouped together. At 440, one or more configuration policies are generated to be applied across the plurality of network devices using the data representing each of the plurality of clusters, while maintaining context of rule processing. That is, the policy rules cannot be added to an access group or marked without noting a context, of which access group the policies belong to, for which device, etc. This ensures that context of policy rule processing is maintained.

In one form, the data from the plurality of network devices is uploaded from a remote location (e.g., a customer datacenter/network) to a centralized management entity data (e.g., the management entity 110). Further still, the management entity may send data to the network to deploy the one or more configuration policies on the plurality of network devices. The data representing the policy rules may be obtained from configuration files for the plurality of network devices.

The comparing operation 420 may involve comparing every pair of policy rules across configuration files for the plurality of network devices to generate a similarity score indicating similarity between two rules of a given pair of policy rules. Further still, the comparing operation 420 may involve generating a plurality of sub-classifications, each containing a set of policy rule statements from a first configuration file and a second of policy rule statements from a second configuration file whose similarity score are above a threshold. Moreover, the plurality of sub-classifications may be combined across the configuration files for the plurality of network devices. In combining, for a given policy rule statement of the first configuration file, an incidence matrix is generated between lines of the first configuration file and a plurality of sub-classifications that refer to the first configuration file.

Figure 5:
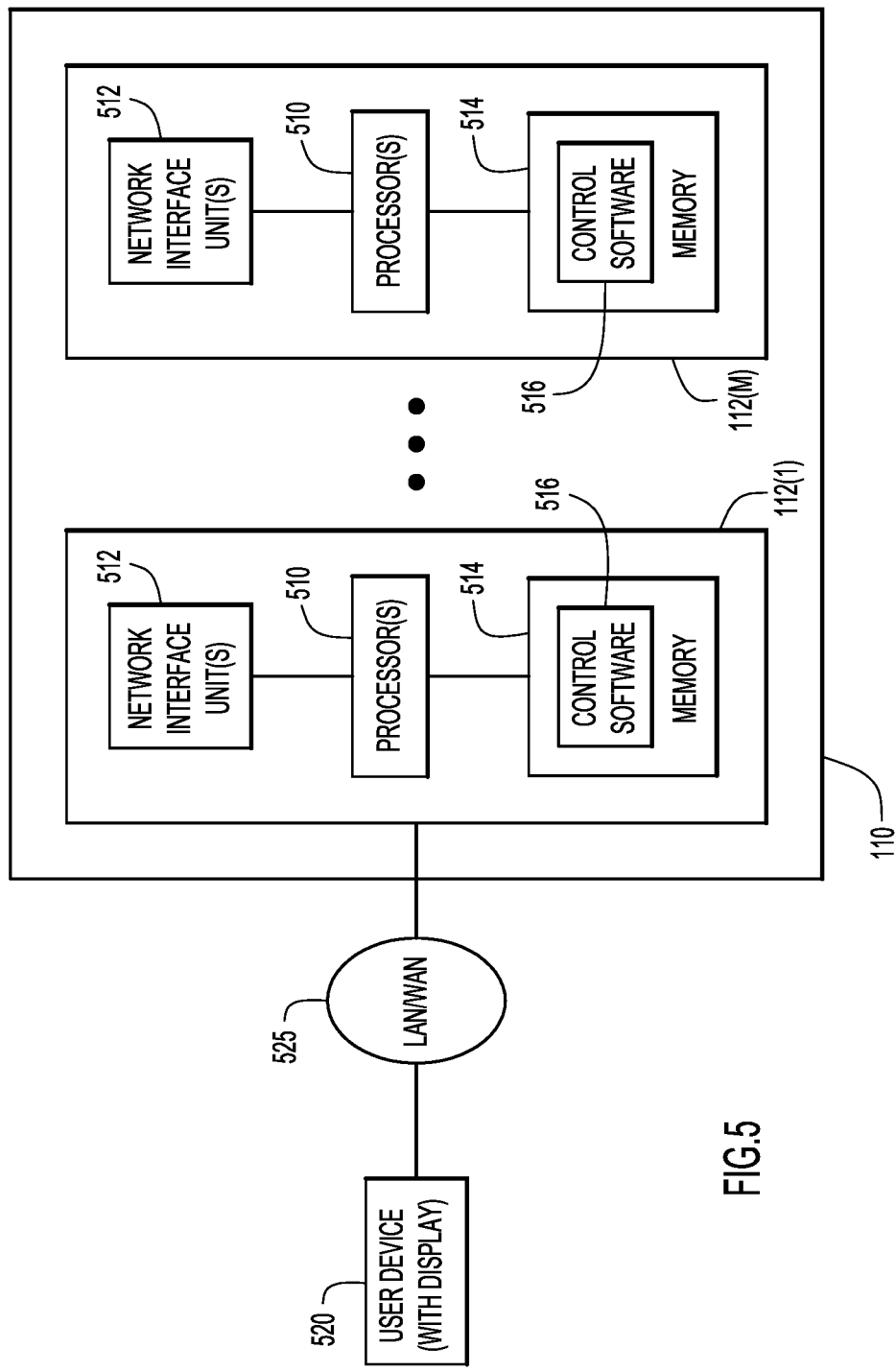
FIG. 5 is a block diagram illustrating an example hardware configuration for a management entity, on which the operations described herein may be executed, according to an example embodiment.

Turning now to FIG. 5, a block diagram is shown of an example hardware implementation for the management entity 110. In one example, the management entity 110 includes one or more servers 112(1)-112(M). Each server includes one or more processors 510, one or more network interface units 512 and memory 514. The memory 514 stores control software 516, that when executed by the processor(s) 510, cause the server to perform the various operations described herein for the management entity 110 and the UI. Local user input/output devices (not shown) may be coupled with management entity 110 to enable a user to enter information and receive information from the management entity. Such devices include, but are not limited to, a display, a keyboard, a mouse, and so on.

The processor(s) 510 may be a microprocessor or microcontroller (or multiple instances of such components). The network interface unit(s) 512 may include one or more network interface cards that enable network connectivity.

The memory 514 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 514 may comprise one or more tangible (non-transitory) computer readable storage media (e.g., memory device(s)) encoded with software or firmware that comprises computer executable instructions. For example, control software 516 includes logic to implement the operations described herein in connection with FIGS. 2A-2C And 3. Memory 514 also stores data (not shown) generated and used by the aforementioned logic.

Administrator 180 may interact with management entity 110 by way of a user device 520 that connects by way of a network (local area network (LAN) and/or wide area network (WAN)) 525 with the management entity 110. The user device 520 may be a personal computer (laptop, desktop), tablet computer, SmartPhone, etc.

In summary, a policy block is a group of lines of rules/statements across configuration files. Lines of rules/statements are grouped into a policy block. The operations described herein determine when multiple policies are to be merged together into one policy. Automatic grouping of access-list policies (using similarity algorithms) has proven invaluable for raising the low level firewall policies to the business policy level allowing better analysis of policies, on a single firewall and across firewalls and other network security products.

Thus, in one form, a method is provided comprising: uploading from a network that includes a plurality of network devices, data representing policy rules configured on the plurality of network devices; comparing the data representing the policy rules for similarities in order to group together policy rules based on their similarities; storing data representing a plurality of clusters, each cluster representing a group of policy rules that have been grouped together; and generating one or more configuration policies to be applied across the plurality of network devices using the data representing each of the plurality of clusters, while maintaining context of policy rule processing.

In another form, an apparatus is provided comprising: a network interface unit configured to enable communications over a network that includes a plurality of network devices; and a processor coupled to the network interface unit, wherein the processor is configured to: upload from the network, data representing policy rules configured on the plurality of network devices; compare the data representing the policy rules for similarities in order to group together policy rules based on their similarities; store data representing a plurality of clusters, each cluster representing a group of policy rules that have been grouped together; and generate one or more configuration policies to be applied across the plurality of network devices using the data representing each of the plurality of clusters, while maintaining context of policy rule processing.

In yet another form, one or more computer readable storage media are provided encoded with software comprising computer executable instructions and when the software is executed operable to perform operations comprising: uploading from a network that includes a plurality of network devices, data representing policy rules configured on the plurality of network devices; comparing the data representing the policy rules for similarities in order to group together policy rules based on their similarities; storing data representing a plurality of clusters, each cluster representing a group of policy rules that have been grouped together; and generating one or more configuration policies to be applied across the plurality of network devices using the data representing each of the plurality of clusters, while maintaining context of policy rule processing.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a management entity in communication with a plurality of network devices:
   uploading from a network that includes the plurality of network devices, data representing policy rules configured on the plurality of network devices obtained from configuration files for the plurality of network devices;
   comparing the data representing the policy rules for similarities in order to group together policy rules based on their similarities, wherein comparing comprises comparing pairs of policy rules across configuration files for the plurality of network devices to generate a similarity score indicating similarity between two rules of a given pair of policy rules, the comparing further including generating a plurality of sub-classifications, each containing a set of policy rule statements from a first configuration file and a set of policy rule statements from a second configuration file whose similarity score is above a threshold;
   storing data representing a plurality of clusters, each cluster representing a group of policy rules that have been grouped together;
   generating one or more configuration policies to be applied across the plurality of network devices using the data representing each of the plurality of clusters, while maintaining context of policy rule processing; and
   sending data to the network to deploy the one or more configuration policies on the plurality of network devices.

2. The method of claim 1, wherein uploading comprises uploading the data from the plurality of network devices at a remote location to a centralized management entity.

3. The method of claim 2, wherein comparing comprises comparing every pair of policy rules across configuration files for the plurality of network devices to generate a similarity score indicating similarity between two rules of a given pair of policy rules.

4. The method of claim 1, further comprising combining the plurality of sub-classifications across the configuration files for the plurality of network devices.

5. The method of claim 4, wherein combining comprises:
   for a given policy rule statement of the first configuration file, generating an incidence matrix between lines of the first configuration file and a plurality of sub-classifications that refer to the first configuration file.

6. The method of claim 1, wherein comparing comprises comparing a given policy rule statement against each of the plurality of clusters to determine whether there is sufficient similarity between the given policy rule statement and a particular cluster of the plurality of clusters so as to assign membership of the given policy rule statement to the particular cluster.

7. The method of claim 6, wherein comparing comprises comparing a group of plurality policy rule statements against each of the plurality of clusters to determine whether there is sufficient similarity between the group of policy rule statements and a particular cluster of the plurality of clusters so as to assign membership of the group of policy rule statements to the particular cluster.

8. The method of claim 7, further comprising generating, for each group of policy rule statements, a stamp based on one or more attributes of policy rule statements and such that each of the plurality of clusters has one or more stamps associated therewith according to the one or more groups of policy rule statements which are a member of the cluster, and wherein comparing comprises comparing the stamp of a particular group of policy rule statements with one or more stamps of each of the plurality of clusters.

9. The method of claim 1, wherein the network devices are network security devices.

10. An apparatus comprising:
    a network interface unit configured to enable communications over a network that includes a plurality of network devices;
    a processor coupled to the network interface unit, wherein the processor is configured to:
    upload from the network, data representing policy rules configured on the plurality of network devices obtained from configuration files for the plurality of network devices;
    compare the data representing the policy rules for similarities in order to group together policy rules based on their similarities by comparing pairs of policy rules across configuration files for the plurality of network devices to generate a similarity score indicating similarity between two rules of a given pair of policy rules, including generating a plurality of sub-classifications, each containing a set of policy rule statements from a first configuration file and a set of policy rule statements from a second configuration file whose similarity score is above a threshold;
    store data representing a plurality of clusters, each cluster representing a group of policy rules that have been grouped together;
    generate one or more configuration policies to be applied across the plurality of network devices using the data representing each of the plurality of clusters, while maintaining context of policy rule processing; and send, via the network interface unit, data to the network to deploy the one or more configuration policies on the plurality of network devices.

11. The apparatus of claim 10, wherein the processor is configured to compare every pair of policy rules across configuration files for the plurality of network devices to generate a similarity score indicating similarity between two rules of a given pair of policy rules.

12. The apparatus of claim 10, wherein the processor is configured to compare a given policy rule statement against each of the plurality of clusters to determine whether there is sufficient similarity between the given policy rule statement and a particular cluster of the plurality of clusters so as to assign membership of the given policy rule statement to the particular cluster.

13. The apparatus of claim 12, wherein the processor is configured to compare a group of plurality policy rule statements against each of the plurality of clusters to determine whether there is sufficient similarity between the group of policy rule statements and a particular cluster of the plurality of clusters so as to assign membership of the group of policy rule statements to the particular cluster.

14. The apparatus of claim 13, wherein the processor is further configured to generate, for each group of policy rule statements, a stamp based on one or more attributes of policy rule statements and such that each of the plurality of clusters has one or more stamps associated therewith according to the one or more groups of policy rule statements which are a member of the cluster, and wherein the processor is configured to compare the stamp of a particular group of policy rule statements with one or more stamps of each of the plurality of clusters.

15. The apparatus of claim 10, wherein the processor is configured to combine the plurality of sub-classifications across the configuration files for the plurality of network devices, by, for a given policy rule statement of the first configuration file, generating an incidence matrix between lines of the first configuration file and a plurality of sub-classifications that refer to the first configuration file.

16. One or more computer readable storage media encoded with software comprising computer executable instructions and when the software is executed by a processor of a management entity in communication with a plurality of network devices, wherein the instructions are operable to cause the processor to perform operations comprising:
uploading from a network that includes a plurality of network devices, data representing policy rules configured on the plurality of network devices obtained from configuration files for the plurality of network devices;
comparing the data representing the policy rules for similarities in order to group together policy rules based on their similarities, wherein comparing comprises comparing pairs of policy rules across configuration files for the plurality of network devices to generate a similarity score indicating similarity between two rules of a given pair of policy rules, the comparing including generating a plurality of sub-classifications, each containing a set of policy rule statements from a first configuration file and a set of policy rule statements from a second configuration file whose similarity score is above a threshold;
storing data representing a plurality of clusters, each cluster representing a group of policy rules that have been grouped together;
generating one or more configuration policies to be applied across the plurality of network devices using the data representing each of the plurality of clusters, while maintaining context of policy rule processing; and
sending data to the network to deploy the one or more configuration policies on the plurality of network devices.

17. The non-transitory computer readable storage media of claim 16, wherein the instructions for comparing comprise instructions for comparing every pair of policy rules across configuration files for the plurality of network devices to generate a similarity score indicating similarity between two rules of a given pair of policy rules.

18. The non-transitory computer readable storage media of claim 16, wherein the instructions operable for comparing comprise instructions operable for comparing a given policy rule statement against each of the plurality of clusters to determine whether there is sufficient similarity between the given policy rule statement and a particular cluster of the plurality of clusters so as to assign membership of the given policy rule statement to the particular cluster.

19. The non-transitory computer readable storage media of claim 18, wherein the instructions operable for comparing include instructions operable for comparing a group of plurality policy rule statements against each of the plurality of clusters to determine whether there is sufficient similarity between the group of policy rule statements and a particular cluster of the plurality of clusters so as to assign membership of the group of policy rule statements to the particular cluster.

20. The non-transitory computer readable storage media of claim 19, further comprising instructions operable for generating, for each group of policy rule statements, a stamp based on one or more attributes of policy rule statements and such that each of the plurality of clusters has one or more stamps associated therewith according to the one or more groups of policy rule statements which are a member of the cluster, and wherein the instructions for comparing include instructions operable for comprises comparing the stamp of a particular group of policy rule statements with one or more stamps of each of the plurality of clusters.

* * * * *